F. S. WASHBURN.
METHOD OF AND APPARATUS FOR PRODUCING PHOSPHORIC ACID AND COMPOUNDS OF THE SAME.
APPLICATION FILED APR. 21, 1919.
1,314,229.
Patented Aug. 26, 1919.
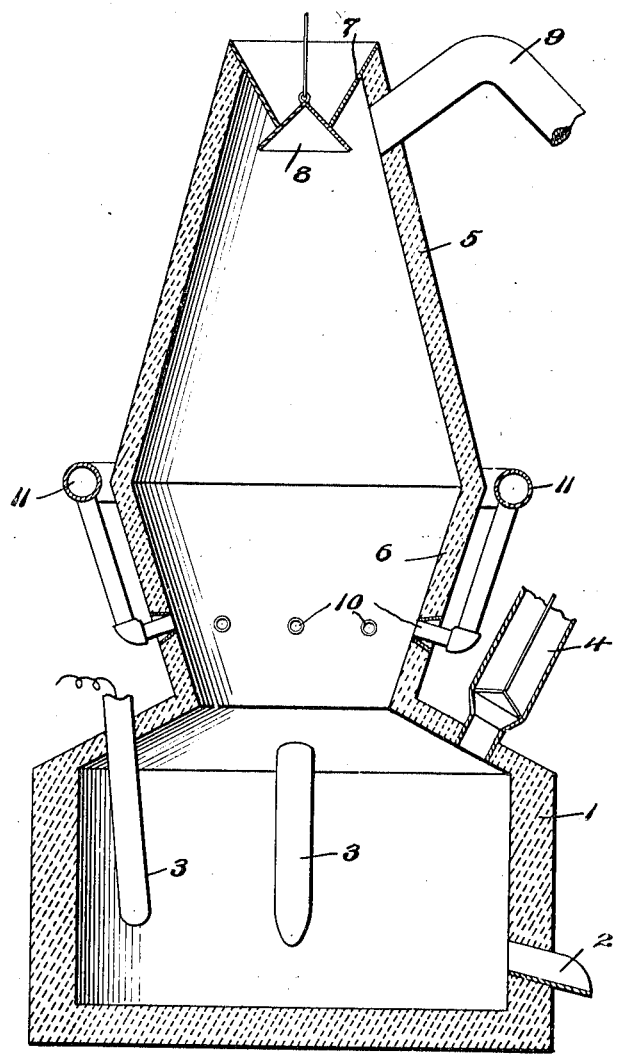
Inventor
F. S. Washburn,
By T. G. Witherspoon
Attorney

UNITED STATES PATENT OFFICE.

FRANK S. WASHBURN, OF RYE, NEW YORK, ASSIGNOR TO AMERICAN CYANAMID COMPANY, OF NEW YORK, N. Y., A CORPORATION OF MAINE.

METHOD OF AND APPARATUS FOR PRODUCING PHOSPHORIC ACID AND COMPOUNDS OF THE SAME.

1,314,229. Specification of Letters Patent. Patented Aug. 26, 1919.

Application filed April 21, 1919. Serial No. 291,529.

*To all whom it may concern:*

Be it known that I, FRANK S. WASHBURN, a citizen of the United States, residing at Rye, in the county of Westchester and State of New York, have invented certain new and useful Improvements in Methods of and Apparatus for Producing Phosphoric Acid and Compounds of the Same; and I do hereby declare the following to be a full, clear and exact description of the invention, such as will enable others skilled in the art to which it appertains to make and use the same.

This invention relates to a method of and apparatus for producing phosphoric acid and compounds of the same, and has for one of its objects to improve certain of the prior processes and apparatus heretofore proposed.

With this and other objects in view the invention consists in the novel steps and combinations of steps constituting the process, and in the novel combinations of parts constituting the apparatus, all as will be more fully hereinafter disclosed and particularly pointed out in the claims.

In order that the precise nature of my present invention may be the more clearly understood it is said:—In my prior U. S. Patent #1,047,864, granted Dec. 17, 1912, and entitled Process of producing phosphorus from mineral phosphates, I have disclosed a method of obtaining phosphorus and its compounds from tri-calcium phosphate in the form of phosphate rock by fusing the said rock together with a flux of silicious material in an electric furnace. As pointed out in the said patent, however, not all of the phosphorus could be liberated from the rock in this manner, even when working the charge at the relatively high temperature obtainable in the electric furnace, and in order to remedy this, the said patent goes on to disclose the addition of a carbonaceous material in order to effect the complete removal of the phosphorus.

The addition of the necessary amount of carbon influences the reaction between the phosphate rock and silica, resulting in the consumption of additional energy to complete the said reaction, and where electricity is utilized to carry out the process, as above indicated, this additional consumption of energy is found to constitute an appreciable item.

In order to reduce the amount of electrical energy required as far as possible, I have found it advantageous to preheat the raw material before charging it into the electric furnace and I have disclosed one method of such preheating in my prior U. S. Patent #1,100,639, granted June 14, 1914, and entitled Process of and apparatus for making phosphoric acid and compounds of the same. In the method disclosed in this said patent, I performed the preheating of the charge, as well as the melting of the same in a blast furnace, by the burning of a comparatively cheap fuel such as coke, charcoal, etc., directly in the charge of rock and silica, which was then tapped into an electric furnace where the reaction was completed, at the efficient high temperatures which may be had therein and which are not obtainable in a fuel fired furnace.

I have found, however, that by suitably utilizing the gaseous products comprising phosphorus and phosphoric acid vapors, and carbon monoxid CO, given off by the reaction which takes place in the said electric furnace, it is possible not only to preheat the incoming charge, but to actually fuse the same before it reaches the electric furnace, without the use of any extraneous fuel whatever, thereby reducing appreciably the amount of electrical energy required for the final reaction, with a consequent increase in efficiency.

In a companion application filed concurrently herewith, Sr. No. 291,528, entitled Process of and apparatus for making phosphoric acid and compounds of the same I have disclosed a method of utilizing the gases given off in the electric furnace to preheat and fuse the incoming charge respectively in a rotary kiln and a hearth furnace, after which the fused material is transferred to the electric furnace, and the reaction completed under heating conditions not obtainable in the said hearth furnace.

In the present case, however, I propose to omit the rotary kiln and by suitably combining the two furnaces to obtain the same result.

Referring to the accompanying drawing forming a part of this specification in which the figure is a diagrammatic sectional view of one form of apparatus made in accordance with this invention, 1 indicates a hearth of suitable refractory material provided with a tap hole 2, a plurality of carbon or other electrodes 3, and a charging chute 4 for introducing carbonaceous material therein, as will presently appear.

Superposed above the said hearth 1 is a shaft 5 having the bosh 6 and resembling somewhat that portion of an iron blast furnace. The said shaft 5 is provided at the top with a charging hopper 7 controlled as by a bell 8, and also with a gas outlet 9. The bosh 6 is provided with a plurality of air inlets 10, supplied from a bustle pipe 11, and adapted to supply the air necessary to effect the burning of the phosphorus and carbon monoxid produced in the hearth 1. The hearth 1 and the shaft 5 may either or both be water cooled, if desired, in any suitable manner not shown.

In operation a small amount of coke is charged into the hearth of the furnace and the electric current turned on. A charge consisting of phosphate rock and silica in approximately the proportions of say 100 parts of Florida rock to 40 parts of silica is fed downward into the furnace until the whole shaft is filled up, or in the case of a large furnace, it would be necessary to scaffold this shaft just as is done in an iron blast furnace. The lower portion of the charge is melted down by the electric current, giving off phosphorus and phosphoric acid vapors and carbon monoxid, which pass up through the downcoming charge, and as the reaction progresses air is introduced through the nozzles 10. This produces combustion of the said gases in the shaft 5 of the furnace, thus preheating the charge until finally it will be found that the charge can be melted down or practically so before it strikes the electrodes and wholly by the combustion.

It is necessary that the air introduced into the upper part of the furnace through the air inlets 10 be closely controlled as it is very desirable to produce as much heat in the furnace as possible without the introduction of a large excess of air which would tend to dilute the valuable gaseous products and render recovery of the phosphoric acid more difficult.

The usual phosphate rock, as for instance Florida pebble, is too fine a state of aggregate to be charged directly into such a shaft furnace as it would prevent free passage of gases upward through the shaft. Whenever such fine rock must be used, however, this difficulty can be overcome by suitably briqueting the mixture of rock and silica together. The electric phosphoric acid furnace produces large quantities of gelatinous silica which may be used for a binder, or other suitable binding agents which exist in large numbers in the briqueting industry, may be used to advantage and no difficulty would be met with in attempting to keep the shaft of the furnace open.

The valuable gaseous products consisting principally of phosphorus pentoxid $P_2O_5$ after fusing and preheating the downcoming charge will pass off through the outlet 9 and may be recovered in any suitable manner, as for example by passing through water to form the ordinary phosphoric acid.

After the furnace has been started with the initial charge of coke, as above stated, additional carbonaceous material may be fed into the fused charge as required from the chute 4, as will be readily apparent.

It is obvious that those skilled in the art may vary the steps of the process, as well as the arrangement of parts constituting the apparatus without departing from the spirit of the invention, and therefore, I do not wish to be limited to the above disclosure except as may be required by the claims.

What I claim is:—

1. The process of producing phosphoric acid, which consists in charging a portion of a mixture of mineral phosphate and silicious material into a furnace; charging a second portion of said mixture into said furnace above said first mentioned portion; adding carbon to said first mentioned portion only; raising said first mentioned portion to a temperature sufficient to liberate carbon monoxid gas and a substantial percentage of the phosphorus present while permitting the evolved gases to rise through the interstices of said second portion of the charge; adding air to said gases; and igniting the carbon monoxid present to preheat the down coming charge, substantially as described.

2. The process of producing phosphorus from phosphate rock which consists in mixing the finely divided rock with a silicious material; placing the mixture into an upper chamber of a furnace; feeding a portion of said mixture from said upper chamber into a lower chamber of said furnace, said lower chamber being devoid of any air supply; adding carbon to said portion fed into said lower chamber and raising its temperature sufficiently to evolve carbon monoxid gas and phosphorus, while permitting the gaseous products of the reaction to permeate the interstices of the material in said upper chamber; adding air to said gaseous products in said upper chamber only; igniting the carbon monoxid and phosphorus present to heat the downcoming charge; and recovering the evolved phosphorus in a combined state from the escaping gases, substantially as described.

3. The process of producing phosphoric acid which consists in charging an upper and a lower portion of a mixture of mineral phosphate and a silicious material into a furnace; adding a carbonaceous material to said lower portion only of said charge; raising the temperature of said lower portion to a point sufficient to liberate carbon monoxid and substantially all of the phosphorus present; adding air to said upper portion and burning the gaseous products of the reaction in said furnace to fuse and preheat said upper portion of said charge while the latter is descending; and adding additional carbonaceous material to said fused portions, substantially as described.

4. The process of producing phosphoric acid and compounds of the same which consists in charging a mixture of phosphate rock and a silicious material into a furnace; adding a carbonaceous material to a portion of said charge; raising the temperature of said portion through the agency of electricity to a point sufficiently high to liberate substantially all its contained phosphorus; burning the gaseous products of the reaction in said furnace to fuse another portion of said charge, whereby a portion of its contained phosphorus is liberated; passing the products of the combustion through the remainder of the charge to preheat the same; and suitably recovering the valuable constituents from said combustion products, substantially as described.

5. The process of producing phosphoric acid and compounds of the same which consists in charging a mixture of phosphate rock and a silicious material into a shaft furnace; adding a carbonaceous material to a portion of said charge; fusing said portion and raising its temperature by means of an electric current to a point sufficiently high to liberate substantially all of its contained phosphorus; admitting air to the shaft of said furnace to cause the combustion of the gaseous products of the reaction whereby another portion of said charge is raised to the fusion point and a portion of its phosphorus liberated; adding additional carbonaceous material to said last mentioned fused portion and subjecting it to the action of the electric current, whereby substantially all of its remaining phosphorus is liberated; passing the products of the combustion above mentioned through the remaining portions of said charge to preheat the same; and suitably recovering the phosphorus and phosphoric acid vapors from said combustion products, substantially as described.

6. The process of producing phosphoric acid and compounds of the same which consists in providing a mixture of phosphate rock and silica in substantially the proportions of 100 parts of rock to 40 parts of silica; suitably briqueting the same; charging said briquets into a shaft furnace; adding a carbonaceous material to the lower portion of said charge; fusing said portion and raising its temperature by means of an electric current to a point sufficiently high to liberate substantially all of its contained phosphorus; admitting air to the shaft of said furnace to cause the combustion of the gaseous products of the reaction, whereby another portion of said charge is raised to the fusion point and a portion of its phosphorus liberated; adding additional carbonaceous material to said last mentioned fused portion and subjecting it to the action of the electric current, whereby substantially all of its remaining phosphorus is liberated; passing the products of the combustion above mentioned through the remaining portions of said charge to preheat the same; and suitably recovering the phosphorus and phosphoric acid vapors from said combustion products, substantially as described.

7. In an apparatus for producing phosphoric acid and compounds of the same from mineral phosphates the combination of a hearth chamber devoid or an air supply and provided with electrodes; a shaft connected with and superposed above said hearth chamber and provided with a charging hopper; means for admitting air to said shaft; means for drawing off the evolved gases from said shaft; and means for introducing a supply of carbonaceous material into said hearth chamber adjacent said electrodes, substantially as described.

In testimony whereof I affix my signature, in presence of two witnesses.

FRANK S. WASHBURN.

Witnesses:
M. G. LOGAN,
H. G. NOLAN.